United States Patent
Gertzmann et al.

(10) Patent No.: US 6,512,073 B2
(45) Date of Patent: Jan. 28, 2003

(54) ELECTRICAL INSULATING ENAMEL BINDERS HAVING A UREA AND/OR HYDANTOIN STRUCTURE

(75) Inventors: Rolf Gertzmann, Leverkusen (DE); Lutz Schmalstieg, Köln (DE); Jan Mazanek, Köln (DE); Bernd Hausstätter, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/977,888

(22) Filed: Oct. 15, 2001

(65) Prior Publication Data

US 2002/0077442 A1 Jun. 20, 2002

(30) Foreign Application Priority Data

Oct. 17, 2000 (DE) .......................................... 100 51 392

(51) Int. Cl.[7] .................. C08G 18/80; C08G 18/32; C08G 18/40; C08L 75/02; C08L 75/04
(52) U.S. Cl. .................. 528/45; 528/73; 427/385.5; 525/454; 525/455; 525/457; 525/458; 525/459; 525/460
(58) Field of Search .................. 528/45, 73; 427/385.5; 525/454, 455, 457, 458, 459, 460

(56) References Cited

U.S. PATENT DOCUMENTS

| 3,549,599 A | 12/1970 | Merten .................. 528/73 |
| 4,100,144 A | 7/1978 | Dünwald et al. .................. 528/60 |
| 4,444,845 A | 4/1984 | Dünwald et al. .................. 428/422.8 |
| 4,587,322 A | 5/1986 | Rasshofer et al. .................. 528/60 |
| 4,853,261 A | 8/1989 | Dünwald et al. .................. 427/388.1 |
| 5,126,170 A | 6/1992 | Zwiener et al. .................. 427/385.5 |
| 5,126,479 A | 6/1992 | Dünwald et al. .................. 560/334 |
| 5,219,657 A | 6/1993 | Ueoka et al. .................. 428/379 |
| 5,236,741 A | 8/1993 | Zwiener et al. .................. 427/385.5 |
| 5,254,659 A | 10/1993 | Tajima et al. .................. 528/45 |
| 5,506,327 A | 4/1996 | Yonek et al. .................. 528/45 |
| 5,561,200 A | 10/1996 | Yonek et al. .................. 528/45 |
| 5,561,211 A | 10/1996 | Yonek et al. .................. 528/45 |
| 5,883,216 A | 3/1999 | Halpaap et al. .................. 528/45 |

FOREIGN PATENT DOCUMENTS

| DE | 246020 | 4/1912 |
| DE | 1170096 | 5/1964 |
| DE | 2158945 | 5/1973 |
| EP | 0 743 333 A1 | 11/1996 |
| GB | 1190342 | 5/1970 |
| GB | 1195886 | 6/1970 |

*Primary Examiner*—Rabon Sergent
(74) *Attorney, Agent, or Firm*—Joseph C. Gil; Thomas W. Roy

(57) ABSTRACT

The present invention relates to novel binders for electrical insulating enamels, comprising at least one hydroxy- and/or amino-functional polyurethane containing urea and/or hydantoin groups, prepared by reacting:

a) from 15 to 40 wt. % of an organic polyisocyanate or of a mixture of organic polyisocyanates, b) from 5 to 20 wt. % of at least one aspartic acid ester, and c) from 5 to 50 wt. % of a polyhydroxy compound having a molar weight from 62 to 3000 g/mol, in d) from 25 to 50 wt. % of a solvent or of a solvent mixture and at least one blocked isocyanate component containing ester, imide, amide, and/or urethane groups, at least one organic solvent, and optionally further auxiliary substances and additives whereby the resulting enamels being distinguished by high temperature stability and good solderability.

12 Claims, No Drawings

ELECTRICAL INSULATING ENAMEL BINDERS HAVING A UREA AND/OR HYDANTOIN STRUCTURE

BACKGROUND OF THE INVENTION

The present invention relates to novel binders for electrical insulating enamels, the resulting enamels being distinguished by high temperature stability and good solderability.

The electrical and electronics industry today requires large amounts of coated wires for the production of motors, transformers, picture tubes and other products. Since the design of modern machines increasingly demands smaller motors, coils, transformers etc., and they work at a higher temperature than their larger equivalent, increased demands are being made of the temperature stability of the wire coatings. In the present application, the temperature stability is defined by the softening temperature of the coating. In many applications, the products are also required to be quickly solderable in order to connect the ends of the coated wires rapidly and simply to other components in an electrically conducting manner.

The electrical insulating enamel coating compositions conventionally used today include conventional coatings having high temperature stability in which polyhydantoins (e.g. FR-A 1 484 694, DE-A 246020), polyimides, polyamide imides (e.g. DE-A 3 544 548, DE-A 3 714 033, DE-A 3 817 614) or polyester amide imides (e.g. U.S. Pat. Nos. 3,652,471, 4,997,891, DE-A 3 249 497) form the main binder component. Wires coated with such products cannot be soldered below a temperature of from 400 to 450° C.

By contrast, electrical insulating enamels based on polyurethane permit rapid solder-ability at comparatively low temperatures. The binders in the wire enamels used in such cases are based on combinations of polyester polyols and phenol or alkanol-blocked polyisocyanates (DE-A 1 170 096 or DE-A 2 626 175). An improvement in the solderability can be achieved by combining blocked polyisocyanates with hydroxy-functional oligourethanes, e.g., DE-A-1 644 794.

In S. Darling, "International Wire Standards-Progress Towards Harmonization" in Proceedings 19th EEI Conference, Chicago 25th to 28th Sep. 1989, p. 56, polyester imides having a temperature index of 180° C. are described as being solderable, but solderability is likewise only present at temperatures above 400° C.

Polyester imides having a high hydroxyl group content, in combination with heat-resistant blocked polyisocyanates, are solderable at 370° C., but they exhibit markedly deteriorating properties in respect of the tan δ break point and the softening temperature as compared with conventional polyester imides. Amide-imide-polyurethane combinations, which are described in EP-A 365 877, also have similar disadvantages. EP-A 752 434 describes raising the softening temperature of solderable wires by introduction of amide/imide-group containing blocked polyisocyanates. Although a marked improvement in solderability is achieved thereby as compared with U.S. Pat. No. 4,997,891, the softening temperature is not improved.

From EP-A 231 509 there are known polyisocyanates containing carbodiimide and/or uretonimine groups and their use in wire enamelling. Depending on the reaction partner, such polyisocyanates are suitable for the production of solderable (Example 1 of EP-A 231 509) or, alternatively, heat-resistant enamelled wires (Example 3 of EP-A 231 509).

According to the teaching of EP-A 287 947, heat-resistant electrical insulating enamels are obtained using unsaturated carboxylic acids in combination with polyisocyanates containing carbodiimide and/or uretonimine groups. If in the production of the wire enamel having hydantoin structures there is used an isocyanurate-containing compound (EP-A 287 947 Example 3), then there is obtained a wire enamel that is solderable at 420° C. and has a softening temperature of 250° C.; if the mixture contains no further OH components other than the OH-containing blocking agents, then non-solderable products having softening temperatures >300° C. are obtained (EP-A 287 947 Example 2).

The use of N,N',N"-tris-(2-hydroxyethyl)-isocyanurate as an additive for polyurethane-based wire enamels also leads to heat-resistant enamelled wires (DE-A 3 133 571).

U.S. Pat. No. 5,254,659 describes the production of heat-resistant, solderable wire enamels from polyimides and imide-modified polyurethanes. Owing to the low solids content of the binders and to the solvents, which are unconventional in the wire enamels industry and, moreover, are comparatively expensive, such products are definitely used only in exceptional cases and for the coating of thin wires.

It may be stated in summary that the teaching of the prior-known prior art amounts either to the production of electrical insulating enamels having a high level of heat resistance (>270° C.) that are not solderable or can be soldered only very slowly at 390° C., or to the production of electrical insulating enamels that are rapidly solderable at 390° C. but have a level of heat resistance of only ≦270° C.

It was an object of the invention to provide a coating composition for heat-resistant substrates, especially for the wire-enamelling of wires, that combines both advantages—heat resistance >270° C. and improved solderability at a temperature of 390° C.

It has been possible to achieve that object by means of the electrical insulating enamel binders according to the invention that are described in greater detail below. The invention is based on the surprising finding that, by using hydroxy-functional compounds containing particular urea and/or hydantoin groups, it is possible to produce electrical insulating enamels that are solderable at temperatures of <400° C. in spite of their excellent temperature stability.

SUMMARY OF THE INVENTION

The invention relates to a binder containing:
A) at least one hydroxy- and/or amino-functional polyurethane containing urea and/or hydantoin groups, prepared by reacting
  a) from 15 to 40 wt. % of an organic polyisocyanate or of a mixture of organic polyisocyanates,
  b) from 5 to 20 wt. % of at least one aspartic acid ester, and
  c) from 5 to 50 wt. % of a polyhydroxy compound having a molar weight from 62 to 3000 g/mol in
  d) from 25 to 50 wt. % of a solvent or of a solvent mixture.
B) at least one blocked isocyanate component containing ester, imide, amide, and/or urethane groups, and
C) organic solvents.

DETAILED DESCRIPTION OF THE INVENTION

Suitable hydroxy-functional polyurethane prepolymers having a hydantoin or urea structure useful as component A) are known from EP-A 743 333. According to that teaching, those compounds are distinguished by improved thermal stability and are suitable especially as binders for the coating of sheet steel. U.S. Pat. No. 3,549,599 describes the preparation of polyhydantoins from aspartic acid esters, as well as the high temperature stability of the products obtained therewith. Even in conjunction with other publications, the person skilled in the art will find in that teaching no indication as regards either the production of solderable wire enamel binders having high temperature stability, or the use of those substances in the production of solderable wire enamel binders.

Suitable starting polyisocyanates a) for the preparation of the hydroxy- and/or amino-functional polyurethanes A) include aromatic, aliphatic or cycloaliphatic polyisocyanates, preferably polyisocyanates having a uniform molecular weight or an average molecular weight in the mean of from 140 to 500 with an average NCO functionality in the statistical mean of not more than 2.6.

Such polyisocyanates include 1,4-phenylene diisocyanate, 2,4- and 2,6-diisocyanatotoluene (TDI) as well as any desired mixtures of those isomers, 4,4'-, 2,4'- and 2,2'-diisocyanatodiphenylmethane (MDI) or any desired mixtures of those isomers or mixtures of those isomers with their higher homologues, as are obtained in a known manner by phosgenation of aniline/formaldehyde condensation products, 1,5-naphthylene diisocyanate, 1,4-butane diisocyanate, 2-methylpentane 1,5-diisocyanate, 1,5-hexane diisocyanate, 1,6-hexane diisocyanate (HDI), 1,3- and 1,4-cyclohexane diisocyanate and any desired mixtures of those isomers, 2,4- and 2,6-diisocyanato-1-methylcyclohexane and any desired mixtures of those isomers, 3,5,5-trimethyl-3-isocyanatomethyl cyclohexaneisocyanate (IPDI), and dicyclohexylmethane 2,4'- and 4,4'-diisocyanate and any desired mixtures of those diisocyanates.

Preferred polyisocyanates a) include those having aromatically bonded isocyanate groups having an average NCO functionality in the statistical mean of from 2 to 2.2 and an average molecular weight optionally in the statistical mean of from 174 to 300.

Diisocyanates that are more preferred include 2,4-diisocyanatotoluene and 2,6-diisocyanatotoluene, the technical mixtures consisting of those isomers, and 4,4'-, 2,4'- and 2,2'-diisocyanatodiphenylmethane or any desired mixtures of those isomers or mixtures of those isomers with their higher homologues, obtained in a known manner by phosgenation of aniline/formaldehyde condensation products, or alternatively any desired mixtures of the aromatic polyisocyanates mentioned here.

For the preparation of the hydroxy- and/or amino-functional polyurethanes A) that are to be used according to the invention there are suitable as component b) aspartic acid esters of the general structural formula (a)

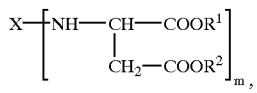

which are obtained according to the teaching of EP-A 403 921, DE-A 1 670 812 and DE-A 2 158 945 by reacting a component of formula (i) containing primary amine groups

with fumaric acid esters and/or maleic acid esters of formula (ii)

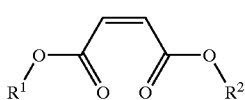

wherein X represents an m-valent organic radical optionally containing one or more hetero atoms, as can be obtained by removing the primary amino group or groups from a corresponding mono- or poly-amine containing (cyclo) aliphatically or araliphatically bonded primary amino groups and having a molecular weight in the range from 60 to 6000, which radical may contain further functional groups that are reactive towards isocyanate groups and/or inert at temperatures up to 100° C.

Suitable fumaric or maleic acid diesters of formula (ii) include compounds in which $R^1$ and $R^2$ represent organic radicals having from 1 to 9 carbon atoms. Preference is given to radicals $R^1$ and $R^2$ having from 1 to 4 carbon atoms, it also being possible for $R^1$ and $R^2$ to represent identical radicals.

Suitable amines (i) include difunctional amines (m=2) or mixtures of difunctional amines and amines having a higher functionality (m=2 and m>2), so that the mean functionality of the aspartic acid esters is $\geq 2$. Also suitable are mixtures of difunctional (m=2) and trifunctional (m=3) amines, wherein the equivalence ratio of difunctional amines to trifunctional amines is from 1:2 to 5:1. Preferred mixtures have an equivalence ratio of difunctional amines to trifunctional amines from 1:1.5 to 3:1.

Examples of suitable difunctional amines (i) include ethylenediamine, 1,2-diaminopropane, 1,4-diaminobutane, 2,5-diamino-2,5-dimethylhexane, 1,5-diamino-2-methylpentane (Dytek A from DuPont), 1,6-diaminohexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane (IPDA), 2,4- and/or 2,6-hexahydrotoluylenediamine ($H_6$TDA), isopropyl-2,4- and/or -2,6-diaminocyclohexane, 1,3-bis-(aminomethyl)-cyclohexane, 2,4'- and/or 4,4'-diamino-dicyclohexylmethane, 3,3'-dimethyl-4,4'-diamino-dicyclohexylmethane (Laromin C 260 from BASF), the isomeric diaminodicyclohexylmethanes having a methyl group as substituent at the nucleus (=C-monomethyl-diaminodicyclohexylmethanes), 3(4)-aminomethyl-1-methylcyclohexylamine (AMCA) and 1,3-bis-(aminomethyl)-benzene.

Examples of amines having a functionality of three or more include 4-aminomethyl-1,8-octanediamine; 2,2',2"-triaminotriethylamine, 1,3,5-tris-(aminomethyl)-2,4,6-triethylbenzene, tris-1,1,1-aminoethylethane, 1,2,3-triaminopropane, tris-(3-aminopropyl)-amine and N,N,N',N'-tetrakis-(2-aminoethyl)-ethylenediamine.

Suitable amines (i) also include mixtures of monoamines (m=1) or diamines (m=2) containing further groups that are reactive towards isocyanates at from 20 to 200° C., with amines having a higher functionality (m>2), so that the mean functionality of the aspartic acid esters (based on all groups that are reactive towards isocyanates between 20 to 200° C.) is $\geq 2$ and <3.5.

Examples of suitable hydroxy-functional amines (i) include 2-aminoethanol, aminopropanols, 3-amino-1,2-propanediol, aminobutanols and 1,3-diamino-2-propanol.

In principle, it is also possible to use low molecular weight polyether polyamines having aliphatically bonded primary amino groups, as are produced by Huntsman under the name Jeffamin.

The aspartic acid esters b) may be prepared either in solution or without a solvent. In both cases, an equimolar reaction of the amine with the fumaric or maleic acid diester is preferably carried out. In order to vary application-related properties of the wire coatings in a controlled manner, the equivalence ratio of maleic or fumaric acid ester to amine i) may be varied from 1.2:1 to 1:2. In the case where mixtures of aspartic acid esters are used, the aspartic acid esters may be prepared separately or in one reaction vessel.

Suitable polyhydroxy compounds c) for the preparation of the hydroxy- and/or amino-functional polyurethanes A) include any desired araliphatic, aliphatic or cycloaliphatic polyhydroxy compounds, preferably polyhydroxy compounds having a uniform molecular weight or an average molecular weight in the mean of from 62 to 3000 with an average OH functionality in the statistical mean of not more than 3. Suitable compounds c) include low molecular weight polyhydroxy compounds, preferably diols and/or triols having a molecular weight in the range from 62 to 350 and, less preferably, also polyhydroxy compounds having molecular weights from 350 to 3000. Suitable polyhydroxy compounds c) having a molecular weight in the range from 62 to 350 include ethylene glycol, propanediols, butanediols, hexanediols, di-, tri- or tetra-ethylene glycol, di-, tri- or tetra-propylene glycol, neopentyl glycol, 2-ethyl-1,3-hexanediol, 2,2,4-trimethyl-1,3-pentanediol, 1,4-bis(hydroxymethyl)-cyclohexane, 2,2-bis(4-hydroxycyclohexyl)-propane, glycerol, hexanetriol and N,N',N"-tris-(2-hydroxyethyl)-isocyanurate (THEIC). Higher molecular weight polyhydroxy compounds c) are, for example, the known polyhydroxy polyesters, as are obtained from dicarboxylic acids such as phthalic acid, isophthalic acid, terephthalic acid or adipic acid with excess polyols of the above-mentioned type. It is also possible to use as higher molecular weight polyols c) known polyhydroxy polyethers obtained by alkoxylation of low molecular weight starter molecules.

Mixtures of the above-mentioned hydroxy-functional compounds may also be used as the polyhydroxy compound c).

Suitable solvents d) include the solvents conventionally employed in wire enamelling, in order to adjust the viscosity of the products to a level necessary for processing. Preferred solvents include phenols, cresols, xylenols and their technical isomeric mixtures, benzyl alcohol, 2-methoxypropyl acetate, butyl acetate, N-methylpyrrolidone, hydrocarbons or hydrocarbon mixtures that are liquid at room temperature, as well as mixtures of the mentioned solvents. Solvent mixtures of the mentioned solvents are preferred.

According to a preferred embodiment for the preparation of the hydroxy- and/or amino-functional polyurethanes A), the polyisocyanate a) is diluted with the solvent or the solvent mixture d) in a weight ratio of from 3:1 to 1:3, preferably from 1.5:1 to 1:1.5. The isocyanate-reactive components b) and c) are mixed together in a weight ratio of from 1:10 to 4:1, preferably from 1:2 to 2:1, and diluted with the solvent or solvent mixture d) in a weight ratio of from 1:10 to 2:1, preferably from 1:1.5 to 1.5:1. The mixture containing the isocyanate-reactive components b) and c) is adjusted to a temperature of from 10 to 150° C., preferably from 20 to 80° C. The solution containing component a) is added to that mixture. The reaction mixture is stirred at a temperature of from 10 to 150° C., preferably from 20 to 80° C., until no further free isocyanate groups can be detected.

The reaction mixture is then preferably stirred at from 80 to 120° C. in order to induce or complete hydantoin formation and remove by distillation, optionally under reduced pressure, the alcohol separated during the reaction, or leave it in the reaction mixture.

In a further embodiment for the preparation of the hydroxy- and/or amino-functional polyurethanes A), the polyisocyanate a) is diluted with the solvent or the solvent mixture d) in a weight ratio of from 3:1 to 1:3, preferably from 1.5:1 to 1:1.5. The isocyanate-reactive components b) and c) are mixed together in a weight ratio of from 1:10 to 4:1, preferably from 1:2 to 2:1, and diluted with the solvent or solvent mixture d) in a weight ratio of from 1:10 to 2:1, preferably from 1:1.5 to 1.5:1. The mixture containing isocyanate-reactive components b) and c) is adjusted to a temperature of from 10 to 150° C., preferably from 20 to 100° C. That mixture is added to the solution containing component a). The reaction mixture is stirred at a temperature of from 10 to 150° C., preferably from 20 to 100° C., until no further free isocyanate groups can be detected.

In further embodiments, it is also possible to use the whole of the solvent for diluting only individual components. A further embodiment for he preparation of the hydroxy- and/or amino-functional polyurethanes A) ay consist, for example, in a two-stage reaction procedure, in which the polyisocyanate a) is first reacted with the aspartic acid ester or aspartic acid ester mixture b) before the polyhydroxy compounds c) are reacted with the remaining polyisocyanate a). A further embodiment may consist in first adding only the polyhydroxy-functional compounds c) to the polyisocyanate a) and adding the aspartic acid ester or the aspartic acid ester mixture b) to the isocyanate only once the first reaction is complete.

In order to accelerate the reaction of the NCO groups with compounds that are reactive towards NCO groups it is possible to use the catalysts known in polyurethane chemistry and described by way of example in Kunststoffhandbuch (eds. Becker/Braun), Vol. 7, Polyurethane, p. 92 ff, Carl Hanser Verlag, Munich Vienna 1983. The catalysts are optionally used in an amount of from 0.01 to 5.0%, based on the polyisocyanates a).

The binders according to the invention for wire enamels are produced by mixing the hydroxy- and/or amino-functional polyurethanes A) at room temperature with blocked enamel polyisocyanates B), organic solvents C) and, optionally, auxiliary substances and additives D) known in the technology of wire enamel coating. The isocyanate-reactive component A) being used in a starting amount resulting in an equivalent ratio of hydroxy- and/or amino-functional groups of component A) to blocked isocyanate groups of component B) of from 1:2 to 1.5:1, preferably from 1:1.5 to 1.3:1.

Suitable blocked enamel polyisocyanates B) include the resins, known from the technology of wire enamelling, that have ester and/or amide, imide,and/or urethane structures and contain blocked isocyanate terminal groups. Preferred components B) include polyamide imides and/or polyimides having an amide, imide,structure content of from 0.5 to 10 wt. % (calculated as –CO–N<, mol. wt.=42). More preferred components B) include polyurethanes that have a urethane group content of from 2 to 20 wt. %, especially that have a urethane group content of from 4 to 15 wt. %, and that are terminated by blocked NCO groups.

Suitable solvent component C) include all organic solvents, conventionally employed in the technology of enamels, that are inert towards isocyanate groups. Examples include ethyl acetate, butyl acetate, ethylene glycol monomethyl or monoethyl acetate, 1-methoxypropyl-2-acetate, 2-butanone, 4-methyl-2-pentanone, cyclohexanone, toluene, xylene, solvent naphtha or mixtures thereof. Also usable, but less preferred, are plasticizers including those based on phosphoric acid, sulfonic acid or phthalic acid esters. In addition to the enamel solvents that are inert towards NCO groups, it is also possible, however, to use a proportion of solvents that are reactive towards NCO groups. There are suitable preferably monofunctional, aliphatic, cycloaliphatic, araliphatic alcohols or, alternatively, phenols such as, for example, isopropanol, n-butanol, n-octanol, 2-methoxyethanol, 2-ethoxyethanol, diethylene glycol monomethyl ether, diethylene glycol monoethyl ether, 1-methoxy-2-propanol, cycloalkonols such as benzyl alcohol, or phenols such as cresol, xylenol as well as their technical isomeric mixtures.

Suitable auxiliary substances and additives D) include the catalysts, pigments and/or flow agents known from the technology of electrical insulating enamels.

The electrical insulating enamel binders according to the invention are stable to storage at room temperature or moderately elevated temperature (up to about 50° C.) and, on heating to temperatures above 60° C., preferably from 100 to 500° C. and especially from 180 to 400° C., react completely to form crosslinked plastics with simultaneous evaporation of any volatile constituents that may be present. The enamels are applied by the immersion, roller application, nozzle or suction felt processes known, application being followed by drying, that is to say hardening, of the enamel layers in conventional drying ovens in a temperature range from 100 to 500° C. and especially from 180 to 400° C.

Of the properties of the electrical insulating enamel binders according to the invention, special mention is to be made of the good solderability and the high softening temperature and high heat-shock temperature of the resulting products as compared with conventional known products of the prior art. Because of the excellent electrical and mechanical properties of the binders according to the invention, the products are suitable also for the production of insulating fabrics or for the impregnation of electric motors.

EXAMPLES

Example 1

Preparation of an Aspartic Acid Ester 53.6 g of 4-aminomethyl-1,8-octanediamine and 109.3 g of 2-methyl-1,5-pentanediamine were placed in a vessel, and 406.2 g of maleic acid dimethyl ester were added thereto, with stirring, so that a temperature of 50° C. was not exceeded in the reaction mixture. Stirring was then continued for 20 hours at 60° C.

Example 2

Preparation of an Enamel Polyisocyanate A 68.3 g of the aspartic acid ester of Example 1 were homogenised with 75.7 g of trimethylolpropane, 31.3 g of 1,3-butanediol, 36.9 g of diethylene glycol and 227.1 g of cresol and added dropwise to a mixture, heated to 80° C., of 242.0 g of 4,4'-MDI (Desmodur 44 M from Bayer AG) dissolved in 227.1 g of MPA. The reaction temperature was maintained at a maximum of 120° C., taking into account the exothermicity, until the free NCO content was less than 0.5%. The calculated OH content was 2.9%.

Example 3

Preparation of an Enamel Polyisocyanate A 63.8 g of the aspartic acid ester of Example 1 was homogenised with 54.9 g of trimethylolpropane, 25.3 g of 1,3-butanediol, 29.8 g of diethylene glycol and 200.0 g of cresol and added dropwise to a mixture, heated to 80° C., of 226.1 g of 4,4'-MDI (Desmodur 44 M from Bayer AG) dissolved in 200.0 g of MPA. The reaction temperature was maintained at a maximum of 120° C., taking into account the exothermicity, until the free NCO content was less than 0.5%. The calculated OH content was 2.9%.

In the following Examples relating to the coating of copper wires, a horizontal wire enamelling installation from Aumann, Espelkamp, FRG, type FLK 240 having an oven length of 2.4 m (modified slightly for medium-diameter wires) was used. Copper wire having a diameter of 0.5 mm was enamelled by means of nozzle application in 7 passages at an oven temperature of 450° C./500° C. at a rate of 12–18 m/min.

The reaction components used for the compounds (A) according to the invention containing Zerewitinoff atoms were cresol-blocked polyisocyanates (B 1 or B 2).

Component B 1 was obtained by the dropwise addition of a mixture of 375.2 g of trimethylolpropane, 1026.0 g of cresol, 155.4 g of n-butanol, 0.4 g of diazabicyclooctane and 8.1 g of dibutyltin dilaurate to 2500 g of 4,4'-MDI (Desmodur 44 M from Bayer AG) at 80° C. (blocked NCO content was 9.8%).

There was used as component B 2 a commercially available blocked polyisocyanate (Desmodur VP LS 2018) from Bayer (blocked NCO content was 9.5%).

Example 4

Production of an Electrical Insulating Enamel According to the Invention 94.2 g of polyisocyanate C, which had been dissolved in 87.2 g of cresol and 87.1 g of xylene, were added to 131.5 g of the OH-functional enamel resin prepared according to Example 1.

A wire coated with that enamel was solderable at 390° C. within 5 seconds, the tan δ break point was 180° C., the softening temperature according to IEC 851, Part 6, 4.1.2, was 280° C. The enamel film exhibited a high degree of flexibility: after 15% pre-extension, the wire could be wound round a 0.5 mm cylindrical pin without the enamel film exhibiting cracks. The heat shock was acceptable with 5% pre-extension on a 0.5 mm pin after 30 minutes at 200° C.

Example 5

Production of an Electrical Insulating Enamel According to the Invention 78.1 g of polyisocyanate B 2, which has been dissolved in 79.1 g of cresol and 79.0 g of xylene, were added to 163.8 g of the OH-functional enamel resin prepared according to Example 2.

A wire coated with that enamel was solderable at 390° C. within 5 seconds, the tan δ break point was 173° C., the softening temperature according to IEC 851, Part 6, 4.1.2, was 280° C. The enamel film exhibited a high degree of flexibility: after 15% pre-extension, the wire could be wound round a 0.5 mm cylindrical pin without the enamel film exhibiting cracks. The heat shock was acceptable without pre-extension on a 0.5 mm pin after 30 minutes at 200° C.

Example 6

Production of an Electrical Insulating Enamel According to the Invention 82.3 g of polyisocyanate B 1, which has been dissolved in 81.2 g of cresol and 81.1 g of xylene, were added to 155.4 g of the OH-functional enamel resin prepared according to Example 2.

A wire coated with that enamel was solderable at 390° C. within 8 seconds, the tan δ break point was 179° C., the softening temperature according to IEC 851, Part 6, 4.1.2, was 290° C. The enamel film exhibited a high degree of flexibility: after 15% pre-extension, the wire could be wound round a 0.5 mm cylindrical pin without the enamel film exhibiting cracks. The heat shock was acceptable with 5% pre-extension on a 0.5 mm pin after 30 minutes at 200° C.

Example 7
Production of an Electrical Insulating Enamel According to the Invention 91.2 g of polyisocyanate B 1, which had been dissolved in 85.6 g of cresol and 85.6 g of xylene, were added to 137.7 g of the OH-functional enamel resin prepared according to Example 2.

A wire coated with that enamel was solderable at 390° C. within 6 seconds, the tan δ break point was 179° C., the softening temperature according to IEC 851, Part 6, 4.1.2, was 290° C. The enamel film exhibited a high degree of flexibility: after 10% pre-extension, the wire could be wound round a 0.5 mm cylindrical pin without the enamel film exhibiting cracks. The heat shock was acceptable with 5% pre-extension on a 0.5 mm pin after 30 minutes at 200° C.

Example 8
Production of an Electrical Insulating Enamel According to the Invention 98.3 g of polyisocyanate B 1, which had been dissolved in 89.2 g of cresol and 89.1 g of xylene, were added to 123.4 g of the OH-functional enamel resin prepared according to Example 1.

A wire coated with that enamel was solderable at 390° C. within 9 seconds, the tan δ break point was 184° C., the softening temperature according to IEC 851, Part 6, 4.1.2, was 290° C. The enamel film exhibited a high degree of flexibility: after 5% pre-extension, the wire could be wound round a 0.5 mm cylindrical pin without the enamel film exhibiting cracks. The heat shock was acceptable with 5% pre-extension on a 0.5 mm pin after 30 minutes at 200° C.

Example 9
Production of an Electrical Insulating Enamel According to the Invention 106.5 g of polyisocyanate B 1, which had been dissolved in 93.3 g of cresol and 93.1 g of xylene, were added to 107 g of the OH-functional enamel resin prepared according to Example 1.

A wire coated with that enamel was solderable at 390° C. within 6 seconds, the tan δ break point was 191° C., the softening temperature according to IEC 851, Part 6, 4.1.2, was 300° C. The enamel film exhibited a high degree of flexibility: after 5% pre-extension, the wire could be wound round a 0.5 mm cylindrical pin without the enamel film exhibiting cracks. The heat shock was acceptable with 5% pre-extension on a 0.5 mm pin after 30 minutes at 200° C.

Example 10
Production of an Electrical Insulating Enamel According to the Invention 112.8 g of polyisocyanate B 1, which had been dissolved in 96.2 g of cresol and 96.2 g of xylene, were added to 94.4 g of the OH-functional enamel resin prepared according to Example 1.

A wire coated with that enamel was solderable at 390° C. within 9 seconds, the tan δ break point was 190° C., the softening temperature according to IEC 851, Part 6, 4.1.2, was 290° C. The enamel film exhibited a high degree of flexibility: after 5% pre-extension, the wire could be wound round a 0.5 mm cylindrical pin without the enamel film exhibiting cracks. The heat shock was acceptable with 5% pre-extension on a 0.5 mm pin after 30 minutes at 200° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A binder comprising

A) at least one hydroxy- and/or amino-functional polyurethane containing urea and/or hydantoin groups, prepared by reacting
      a) from 15 to 40 wt. % of an organic polyisocyanate or of a mixture of organic polyisocyanates,
      b) from 5 to 20 wt. % of at least one aspartic acid ester, and
      c) from 5 to 50 wt. % of a polyhydroxy compound having a mean average molecular weight from 62 to 3000 g/mol and being other than an aspartic acid ester, in
      d) from 25 to 50 wt. % of a solvent or of a solvent mixture, B) at least one blocked isocyanate component containing ester, imide, amide, and/or urethane groups, and C) at least one organic solvent.

2. The binder of claim 1 wherein component a) comprises aromatically bonded isocyanate groups having an average NCO functionality of 2 to 2.2 and an average molecular weight of from 174 to 300.

3. The binder of claim 1 wherein the aspartic acid ester b) is prepared from a mixture of a difunctional amine and a trifunctional amine at an equivalent ratio of from 1:2 to 5:1.

4. The binder of claim 1 wherein the aspartic acid ester b) is prepared from a mixture of a difunctional amine and a trifunctional amine at an equivalent ratio of from 1:1.5 to 3:1.

5. The binder of claim 1 wherein the aspartic acid ester b) comprises no further groups that are reactive towards isocyanates in the range from 10 to 150° C., other than the secondary amine groups.

6. The binder of claim 1 wherein the weight ratio of b) and c) is from 1:10 to 4:1.

7. The binder of claim 1 wherein the weight ratio of b) and c) is from 1:2 to 2:1.

8. The binder of claim 1 wherein compound c) has a molar weight of 62 to 350.

9. The binder of claim 1 wherein component B) comprises a blocked isocyanate containing urethane groups.

10. A process of producing an electrical insulating enamel comprising the step of adding the binder of claim 1 onto a substrate.

11. The process of claim 10 further comprising the step of adding a polyurethane containing blocked isocyanate groups to the binder before adding the binder onto the substrate.

12. An enamel prepared from the binder of claim 1.

* * * * *